J. W. PRICE.
TIRE CONSTRUCTION.
APPLICATION FILED FEB. 6, 1919.
1,319,110.
Patented Oct. 21, 1919.
2 SHEETS—SHEET 1.
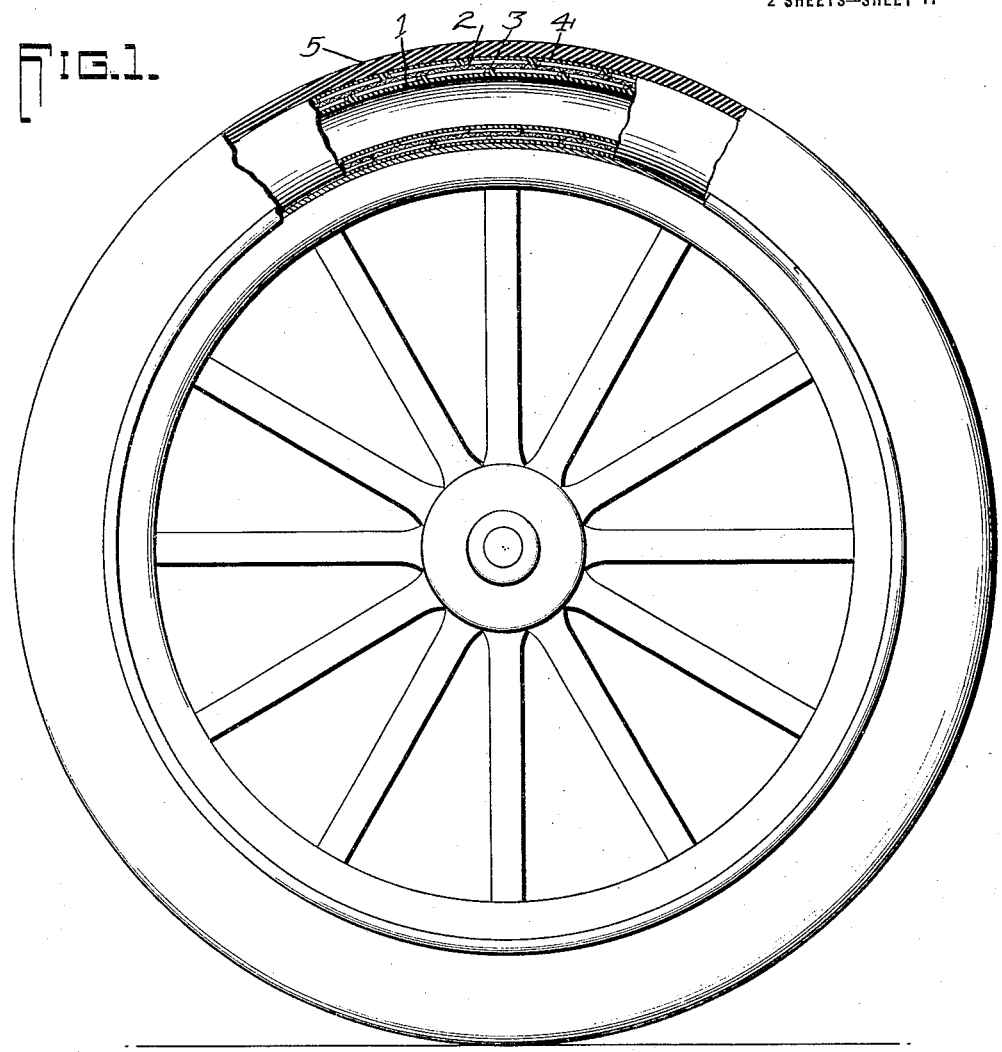
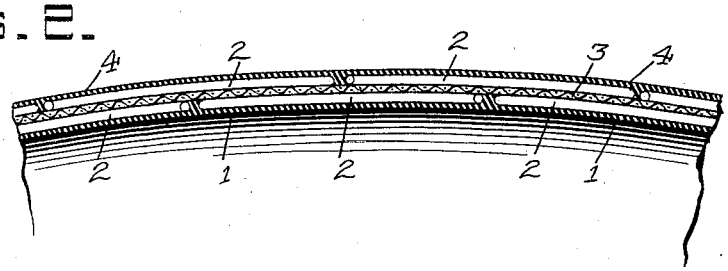
WITNESSES
INVENTOR
J. W. PRICE
BY
ATTORNEYS

J. W. PRICE.
TIRE CONSTRUCTION.
APPLICATION FILED FEB. 6, 1919.

1,319,110.

Patented Oct. 21, 1919.
2 SHEETS—SHEET 2.

WITNESSES
John N. Phillips Jr.

INVENTOR
J. W. PRICE
BY
ATTORNEYS

UNITED STATES PATENT OFFICE.

JAMES W. PRICE, OF HENRYETTA, OKLAHOMA, ASSIGNOR OF ONE-HALF TO HETTIE T. MILLER, OF HENRYETTA, OKLAHOMA.

TIRE CONSTRUCTION.

1,319,110.      Specification of Letters Patent.      Patented Oct. 21, 1919.

Application filed February 6, 1919. Serial No. 275,422.

*To all whom it may concern:*

Be it known that I, JAMES W. PRICE, a citizen of the United States, and a resident of Henryetta, in the county of Okmulgee and State of Oklahoma, have invented certain new and useful Improvements in Tire Constructions, of which the following is a specification.

My invention relates to improvements in tire constructions, which are especially designed for vehicles such as automobiles and the like, and it consists in the combinations and arrangements herein described and claimed.

An object of my invention is to provide a novel structure by means of which a rubber tire may be held in extended condition regardless of punctures.

A further object of my invention is to provide a spring stiffening means of such construction that the tire may be pressed entirely out of shape, but will be brought back into shape by the spring stiffening means without bending the latter beyond its elastic limit.

A further object of my invention is to provide a spring stiffening means for a tire which is relatively simple in construction, but which will permit of the torsional movement necessary when the tire is pressed out of shape by external forces.

Other objects and advantages will appear in the following specification, and the novel features of the invention will be particularly pointed out in the appended claims.

My invention is illustrated in the accompanying drawings forming a part of this application, in which—

Figure 3:
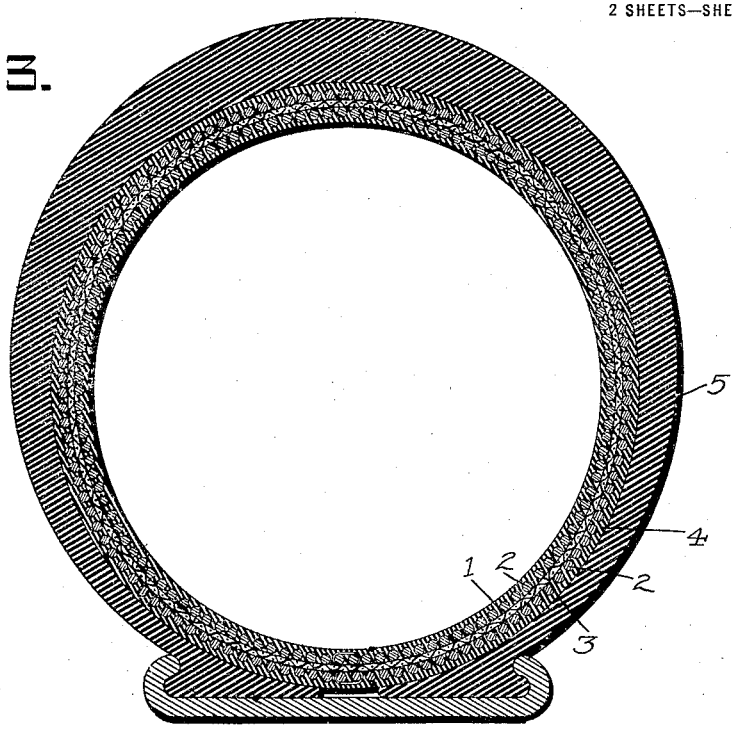
Figure 4:
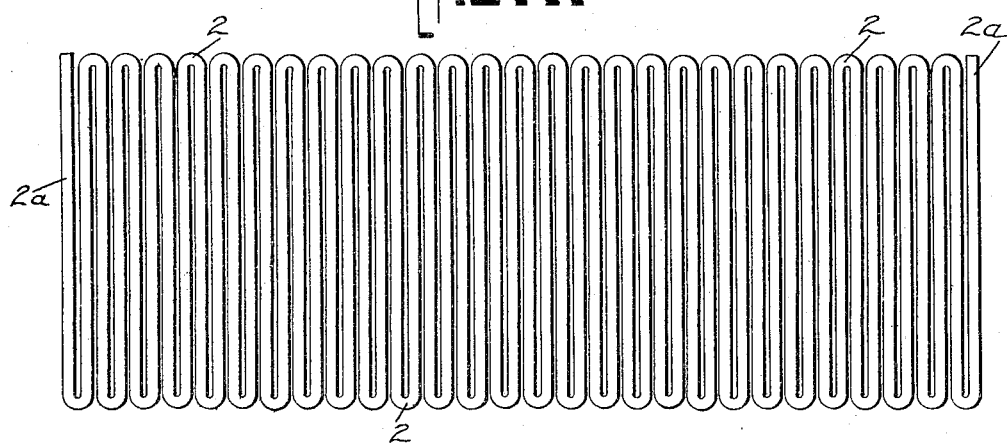
Figure 5:
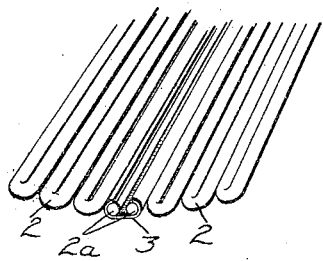

Figure 1 is a face view of a wheel, provided with a tire constructed according to my invention, a portion of the tire being shown in section, Fig. 2 is a longitudinal sectional view through a portion of the tire, Fig. 3 is a sectional view transversely through the tire and rim, Fig. 4 is a plan view of a spring member prior to its insertion in the tube, and Fig. 5 is a perspective view of a portion of the ends of a spring member showing the manner in which the ends are joined together.

In carrying out my invention, I provide an inner tube comprising an inner layer of rubber 1, (see Figs. 2 and 3). Next to this layer is a series of circular bands made from large resilient wire such as steel wire. In Fig. 4 I have shown one of the elements of which these bands are composed.

As will be seen from the drawing, the wire is bent back and forth upon itself to form a series of open ended loops 2. These loops as will be observed, are very narrow, that is to say, the sides of adjacent loops are as close together as possible. Fig. 4 shows the loops as being slightly spaced apart, but the idea is to have adjacent portions of wire close together.

A section such as that shown in Fig. 4 is bent around in circular form, and its ends are secured by means of a fastening device 3 which in the present instance consists of a sheet of metal having curved ends arranged to engage and hold the end members $2^a$ of the loops 2.

Referring again to Fig. 2, it will be seen that the bands formed of the springs 2 are placed successively around the inner layer 1 of the tube. A covering layer of fabric 3 is provided, this fabric layer being canvas or a mixture of rubber and canvas or any suitable covering.

A second layer of bands formed of the spring loops 2 is provided, the bands of the second layer overlapping those of the first named layer of bands, as will be seen from Fig. 2. The outer layer 4 is of rubber.

An inner tube thus formed is disposed inside of a casing such as that shown at 5, which may be the same as the ordinary pneumatic tire casing. A tire constructed in accordance with this invention has the following characteristics: It will hold the inner tube in its extended position regardless of punctures, but when the tire as a whole is compressed or forced out of its normal position by external force, the stiffening members or bands made up of the wire will immediately restore the tire to its normal condition when the external force is removed. This is due to the fact that the stiffening wires have their loops very close together. This provides for a slight torsional action in a large number of loops so that no one particular loop is strained beyond its elastic limit, even though the tire should be compressed out of all semblance of its normal extended condition.

In actual practice, I have found that the placing of these loops close together will accomplish the result, whereas if the loops are not close together, then the same force which distorts the tire will bend the loops beyond the elastic limit and the stiffening member will fail utterly to restore the tire to its normal condition. It is therefore essential as stated above, that the loops be close together so as to provide for the torsional movement of a relatively large number when the tire is distorted by external force.

I claim:—

1. In a tire construction, an inner tube composed of a series of layers, the outer and inner layers being made of rubber, a central layer of fabric, and intermediate layers of stiffening spring bands, said intermediate layers being adjacent to said central layer and each band of said intermediate layers consisting of a single metal wire bent back upon itself to form open ended loops, adjacent loops being close together and the width of the loop being relatively small in comparison with its length, the ends of each band being bent around into contact with one another, means for securing the contiguous ends of the bands together, and an outer casing for said inner tube.

2. A tire construction, comprising an inner tube, having two layers of stiffening bands, and an intermediate layer of fabric, each of said bands comprising an endless spring wire bent to form open ended loops, the adjacent loops being close together, and the ends of the band being secured together, the bands of one layer overlapping the bands of the other layer.

3. A tire construction, comprising an inner tube, a series of stiffening bands for said inner tube, each stiffening band comprising a spring wire bent back upon itself to form a series of open ended loops, adjacent loops being in close relation to one another, and an outer casing for said inner tube.

JAMES W. PRICE.